US012662387B2

(12) United States Patent (10) Patent No.: US 12,662,387 B2
Wehmeier et al. (45) Date of Patent: Jun. 23, 2026

(54) PRECIPITATED SILICIC ACIDS, PROCESS FOR THEIR PREPARATION AND USE THEREOF

(71) Applicant: Evonik Operations GmbH, Essen (DE)

(72) Inventors: André Wehmeier, Bornheim (DE); Dominik Maschke, Erftstadt (DE); Agnieszka Ochenduszko, Attinghausen (CH)

(73) Assignee: Evonik Operations GmbH, Essen (DE)

( * ) Notice: Subject to any disclaimer, the term of this patent is extended or adjusted under 35 U.S.C. 154(b) by 550 days.

(21) Appl. No.: 18/250,405

(22) PCT Filed: Oct. 18, 2021

(86) PCT No.: PCT/EP2021/078743
§ 371 (c)(1),
(2) Date: Apr. 25, 2023

(87) PCT Pub. No.: WO2022/089971
PCT Pub. Date: May 5, 2022

(65) Prior Publication Data
US 2023/0391630 A1 Dec. 7, 2023

(30) Foreign Application Priority Data
Oct. 28, 2020 (EP) .................................... 20204259

(51) Int. Cl.
*C01B 33/193* (2006.01)
*C08L 9/00* (2006.01)
(52) U.S. Cl.
CPC .............. *C01B 33/193* (2013.01); *C08L 9/00* (2013.01); *C01P 2006/14* (2013.01)
(58) Field of Classification Search
CPC ....... C01B 33/193; C08L 9/00; C01P 2006/14
See application file for complete search history.

(56) References Cited

U.S. PATENT DOCUMENTS

| | | | | |
|---|---|---|---|---|
| 7,608,234 | B2* | 10/2009 | Stenzel | B60C 1/00 423/339 |
| 11,168,204 | B2* | 11/2021 | Boivin | C08L 9/06 |
| 2005/0032965 | A1* | 2/2005 | Valero | C08K 3/36 524/493 |
| 2007/0059232 | A1* | 3/2007 | Stenzel | C09C 1/3081 423/335 |
| 2007/0100057 | A1 | 5/2007 | Stenzel et al. | |
| 2009/0214449 | A1* | 8/2009 | Valero | C01B 33/193 106/491 |

| | | | | |
|---|---|---|---|---|
| 2010/0221541 | A1 | 9/2010 | Valero et al. | |
| 2011/0263784 | A1 | 10/2011 | Valero et al. | |
| 2017/0058111 | A1* | 3/2017 | Boivin | C08L 9/06 |

FOREIGN PATENT DOCUMENTS

| | | |
|---|---|---|
| CN | 1145330 A | 3/1997 |
| CN | 102137813 A | 7/2011 |
| CN | 106029568 A | 10/2016 |
| CN | 109996763 A | 7/2019 |
| EP | 0 647 591 A1 | 4/1995 |
| EP | 1 764 344 A2 | 3/2007 |
| JP | 2007-77011 A | 3/2007 |
| WO | WO 2020/120393 A1 | 6/2020 |

OTHER PUBLICATIONS

International Search Report and Written Opinion issued on Jan. 21, 2022 in PCT/EP2021/078743 filed on Oct. 18, 2021 16 pages.
U.S. Pat. No. 10,522,672, Sep. 7, 2010, US 2006-0099129 A1, Oleg Stenzel et al.
U.S. Pat. No. 7,628,971, Dec. 8, 2009, US 2008-0293871 A1, Oleg Stenzel et al.
U.S. Pat. No. 7,855,248, Dec. 21, 2010, US-2006-0100344 A1, Oleg Stenzel et al.
U.S. Pat. No. 8,986,442, Mar. 24, 2015, US 2006-0254463 A1, Hans-Detlef Luginsland et al.
U.S. Pat. No. 8,597,425, Dec. 3, 2013, US 2006-0165581 A1, Oleg Stenzel et al.
U.S. Pat. No. 9,540,247, Jan. 10, 2017, US 2013-0251616 A1, Oleg Stenzel et al.
U.S. Pat. No. 7,566,433, Jul. 28, 2009, US 2007-0059232 A1, Oleg Stenzel et al.
U.S. Pat. No. 7,608,234, Oct. 27, 2009, US 2007-0100057 A1, Oleg Stenzel et al.
U.S. Pat. No. 8,658,816, Feb. 25, 2014, US 2011-0021801 A1, Andre Wehmeier et al.
U.S. Pat. No. 10,487,195, Nov. 26, 2019, US 2018-0118926 A1, Niko Haberkorn et al.
U.S. Appl. No. 18/004,139, filed Jan. 3, 2023, Herbert Thoma et al.
U.S. Pat. No. 11,254,693, Feb. 22, 2022, US 2020-0048285 A1, Alexander Koepfer et al.
U.S. Appl. No. 17/260,137, filed Jan. 13, 2021, US 2021/0292520 A1, Andre Wehmeier et al.
U.S. Appl. No. 17/997,881, filed Apr. 12, 2021, Kai-Steffen Krannig et al.
U.S. Appl. No. 18/250,405, filed Apr. 25, 2023, Andre Wehmeier et al.

* cited by examiner

*Primary Examiner* — Richard M Rump
(74) *Attorney, Agent, or Firm* — Oblon, McClelland, Maier & Neustadt, L.L.P.

(57) ABSTRACT

Precipitated silicas having, a N-cetyl-N,N,N-trimethylammonium bromide (CTAB) surface area $\leq 115$ m$^2$/g, a dioctyl adipate (DOA) absorption $\geq 130$ ml/(100 g), a RoTap for >300 µm of $\geq 86\%$, and a pore volume distribution of V (d5–d50)/V (d5–d100)<0.66. A method of producing the precipitated silicas.

9 Claims, No Drawings

PRECIPITATED SILICIC ACIDS, PROCESS FOR THEIR PREPARATION AND USE THEREOF

CROSS REFERENCE TO RELATED APPLICATIONS

This application is a National Stage entry under 35 U.S.C. § 371 of PCT/EP2021/078743, filed on Oct. 18, 2021, and claims priority to European Patent Application No. 20204259.4, filed on Oct. 28, 2020. The entire contents of both are incorporated herein by reference.

The present invention relates to precipitated silicas, to processes for preparation thereof and to the use thereof.

WO2012059234 discloses elastomer compositions comprising at least one isoprene elastomer and a silica as reinforcing inorganic filler, wherein the silica has a CTAB surface area between 40 $m^2/g$ and 525 $m^2/g$, BET surface area between 45 $m^2/g$ and 550 $m^2/g$, a range Ld ((d84-d16)/d50), measured by particle size XDC after deagglomeration with ultrasound, of at least 0.91, and a pore volume distribution with a range V (d5–d50)/V (d5–d100) of at least 0.66, and 3-acryloyloxypropyltriethoxysilane as adhesion promoter.

Also known from EP2102104 is a process for producing silicas, wherein the silica has a CTAB surface area of 40 $m^2/g$ to 525 $m^2/g$, a BET surface area of 45 $m^2/g$ to 550 $m^2/g$, a range Ld ((d84-d16)/d50), measured by XDC particle size analysis after ultrasound deaggregation, of at least 0.91, and a pore volume distribution V (d5-d50)/V(d5-d100) of at least 0.66.

EP1831297 and WO2006072704 disclose the use of a silica having a BET surface area of at least 60 $m^2/g$ as inorganic filler in a thermoplastic polymer material for increasing the stiffness of the material while maintaining or improving its impact resistance.

Also known from US2005032965 and WO2008077948 are silicas having a CTAB surface area between 40 $m^2/g$ and 525 $m^2/g$, a BET surface area between 45 $m^2/g$ and 550 $m^2/g$, a size distribution range Ld ((d84-d16)/d50), measured by XDC particle size analysis after ultrasound breakdown, of at least 0.91, and a pore volume distribution V (d5-d50)/V(d5-d100) of at least 0.66.

One disadvantage of the known silicas within the specific surface area range desired is poor dispersion in rubber mixtures and hence poor abrasion properties of the rubber mixtures, particularly when used as tread mixtures.

It is an object of the present invention to provide a silica having improved dispersion in the rubber mixtures compared to the known silicas. At the same time, the silica should if at all possible be in pellet form for it to have very good incorporability and easy workability into the rubber matrix.

The invention provides precipitated silicas characterized by the following physicochemical parameters:

| CTAB surface area | $\leq 115$ $m^2/g$, preferably $\leq$ 105 $m^2/g$, more preferably $\leq$ 90 $m^2/g$, even more preferably 45 $m^2/g$-90 $m^2/g$, especially preferably 65 $m^2/g$-90 $m^2/g$ and very especially preferably 70 $m^2/g$-90 $m^2/g$, |
| --- | --- |
| DOA absorption | $\geq 130$ ml/(100 g), preferably $\geq$ 140 ml/(100 g), more preferably 145 ml/(100 g)-190 ml/(100 g), |
| Ro-Tap > 300 μm | $\geq 86\%$, preferably 86%-98%, more preferably 86%-95% and especially 90%-95%, |

-continued

| V (d5-d50)/ V (d5-d100) | <0.66, preferably 0.30-0.65, and especially 0.30-0.64. |
| --- | --- |

The precipitated silicas according to the invention may have a BET surface area of $\leq 125$ $m^2/g$, preferably $\leq 115$ $m^2/g$, more preferably 70 $m^2/g$-105 $m^2/g$.

The precipitated silicas according to the invention may have a Sears number$_{original}$ (ml KOH based on 1.5 g of silica) of 7.0-20.0 ml/(1.5 g), preferably of 9.0-15.0 ml/(1.5 g) and more preferably of 11.0-14.0 ml/(1.5 g).

The precipitated silicas according to the invention may have a silanol group density of 5.4 $OH/nm^2$, preferably 5.5 $OH/nm^2$.

The precipitated silicas according to the invention may have a drying loss of 2%-10%, preferably 4%-8%.

The precipitated silicas according to the invention may have a pH of 4.0-7.0, preferably 5.5-7.0.

The precipitated silicas according to the invention may have an electrical conductivity of $\leq 1200$ μS/cm, preferably 200 μS/cm-800 μS/cm.

The precipitated silicas according to the invention may have an ignition residue of 3%-5%, preferably 4%-5%.

The precipitated silicas according to the invention may have a Ro-Tap <75 μm value of $\leq 10\%$, preferably $\leq 8\%$.

The precipitated silicas according to the invention may have a bulk density of at least 180 g/l, preferably of 200 g/l-350 g/l, more preferably of 250 g/l-330 g/l and most preferably of 250 g/l-320 g/l.

The precipitated silicas according to the invention may have a TAR value (fraction of granule grains: 3.14 mm-5.00 mm) of 15%-60%, preferably 20%-50%.

The precipitated silicas according to the invention may have a PV value 0.0042 MPa-414 MPa, 140°, measured by Hg porosimetry, of 1.00-3.00 ml/g, preferably 1.35-2.40 ml/g and more preferably of 1.35-2.00 ml/g.

The precipitated silicas according to the invention may have a pore maximum (Hg, −dV/d log D, contact angle 140°, surface tension 480 mN/m), of 35 nm-100 nm, preferably 45 nm-80 nm and more preferably of 50 nm-70 nm.

The precipitated silicas according to the invention may be used in compacted form and more preferably in pellet form. It is possible here for at least 50% of the granule grains resulting from the Ro-Tap >300 μm fraction to have a longest dimension of a granule grain (defined as "grain length") in terms of height, width or length of not less than 1.0 mm, preferably >1.5 mm, more preferably >2.5 mm and especially preferably >3.0 mm.

The present invention further provides a process for producing the precipitated silica according to the invention, which is characterized in that a) an aqueous solution of an organic and/or inorganic salt and/or an alkali metal or alkaline earth metal silicate and/or an organic and/or inorganic base with a pH 9 is initially charged, b) waterglass and an acidifying agent are metered simultaneously into this initial charge while stirring at 80-98° C. for 60-120 minutes, preferably at 85-98° C. for 80-110 minutes, c) then the addition of waterglass is stopped, and acid only is metered in in a smaller amount than before in order to attain a pH of the mixture (measured at 60° C.) of 8.3-10.0, d) then the mixture is stirred further at high temperature 85° C., preferably at >90° C., for min up to 200 min, preferably at 60-150 min, but without adding further reactants, e) sulfuric acid is used for acidification to a pH of about 3.5-4.5 (measured at 60° C.) and f) the mixture is filtered, dried to a drying loss of <8%, preferably by means of spray drying or spin flash drying units, and then pelletized.

The process according to the invention can be performed at temperatures 80° C. and ageing at ≥85° C. throughout the precipitation process. As a result, as well as the specific surface areas in the region of ≤115 m²/g, a very high level of internal structure for this surface area range is also generated, which is very advantageous for incorporation into a matrix, for example rubber. This is manifested in the high DOA values. These structures are largely conserved even after the actually structure-destroying pelletization, since the high silanol group density generated leads to a stabilized structure of the silica.

The initial charge may be 20% to 90%, preferably 30% to 90%, more preferably 40%-90%, of the final volume of the precipitate. It is possible to use an initial charge with only a low level of electrolyte (salt), if any, and to add the electrolytes continuously or batchwise (preferably at the start of the precipitation).

It is optionally possible to additionally add organic or inorganic salts during steps a), b), c), e) or f) as well. This can be performed in solution or in solid form, in each case continuously or as a batchwise addition. It is also possible to dissolve the salts in one or more components and then to add them simultaneously therewith. The salts may contain the following anions and cations:

$Li^+$, $Na^+$, $K^+$, $Rb^+$, $Be^{2+}$, $Mg^{2+}$, $Ca^{2+}$, $Sr^{2+}$, $Ba^{2+}$, $H^+$, $F^-$, $Cl^-$, $Br^-$, $I^-$, $SO_3^{2-}$, $SO_4^{2-}$, $HSO_4^-$, $PO_3^{3-}$, $PO_4^{3-}$, $NO_3^-$, $NO_2^-$, $CO_3^{2-}$, $HCO_3^-$, $OH^-$, $TiO_3^{2-}$, $ZrO_3^{2-}$, $ZrO_4^{4-}$, $AlO_2^-$, $Al_2O_4^{2-}$, $BO_4^{3-}$.

Suitable organic salts are the salts of formic acid, acetic acid and propionic acid. Cations include the alkali metal or alkaline earth metal ions mentioned. The concentration of these salts in the initial charge may be 0.01 to 5.00 mol/l. The inorganic salt used is preferably $Na_2SO_4$. It is possible to feed in the acidifying agent in the same or a different way in steps b), c) and e), i.e. with the same or different concentrations and/or feed rates. Analogously, it is also possible to feed the waterglass into the reaction in the same or a different way in steps a) and b).

Aside from waterglass (sodium silicate solution), it is also possible to use other silicates such as potassium silicate or calcium silicate. Acidifying agents used may, as well as sulfuric acid, also be other acidifying agents such as HCl, $HNO_3$, $H_3PO_4$ or 002. The filtration and drying of the silicas are familiar to the person skilled in the art, as described, for example, in EP 1762544 B1 and the patents cited therein. Preference is given to drying the silica in a flow dryer, spray dryer, staged dryer, belt dryer, rotary dryer, flash dryer, spin-flash dryer or nozzle tower. These drying variants include operation with an atomizer, a one- or two-phase nozzle, or an integrated fluidized bed. The precipitated silica after the drying step preferably has a particle shape having an average diameter of more than 15 μm, especially more than 80 μm, more preferably more than 200 μm. After the drying, it is also possible to perform pelletization with a roll compactor having a downstream crusher, with which the final grain length is established.

The invention further provides a rubber mixture comprising (A) a rubber or a mixture of rubbers and (B) at least one precipitated silica according to the invention.

Rubber used may be natural rubber and/or synthetic rubbers. Preferred synthetic rubbers are described for example in W. Hofmann, Kautschuktechnologie [Rubber Technology], Genter Verlag, Stuttgart 1980. They may include:

polybutadiene (BR), polyisoprene (IR), styrene/butadiene copolymers, for example emulsion SBR (E-SBR) or solution SBR (S-SBR), preferably having styrene contents of 1% to 60% by weight, more preferably 5% to 50% by weight (SBR), chloroprene (CR), isobutylene/isoprene copolymers (IIR), butadiene/acrylonitrile copolymers having acrylonitrile contents of 5% to 60%, preferably 10% to 50%, by weight of (NBR), partly hydrogenated or fully hydrogenated NBR rubber (HNBR), ethylene/propylene/diene copolymers (EPDM), abovementioned rubbers which also have functional groups, e.g. carboxy, silanol or epoxy groups, for example epoxidized NR, carboxy-functionalized NBR or silanol (—SiOH)— or siloxy(—Si—OR)-functionalized SBR, and mixtures and masterbatches of these rubbers. It is also possible to use the latices of the abovementioned rubbers, especially in conjunction with liquid-phase mixing or continuous liquid-phase mixing.

In a preferred embodiment, the rubbers may be sulfur-vulcanizable. For the production of car tyre treads it is in particular possible to use anionically polymerized S-SBR rubbers (solution SBR) with a glass transition temperature above −50° C., and also mixtures of these with diene rubbers. It is possible with particular preference to use S-SBR rubbers wherein the butadiene components have a vinyl content of more than 20% by weight. It is possible with very particular preference to use S-SBR rubbers wherein the butadiene components have a vinyl content of more than 50% by weight.

It is preferably possible to use mixtures of the abovementioned rubbers which have an S-SBR content of more than 50% by weight, more preferably more than 60% by weight.

More particularly, it is possible to use polymer blends of unfunctionalized and/or functionalized S-SBR/BR and S-SBR/BR/NR grades in tread compounds, often also with addition of resins. These resins may be of natural or synthetic origin and may be in chemically modified form or in the form of blends of different resins.

The rubber mixture according to the invention may comprise additional fillers. The following fillers may be used as such fillers for the rubber mixture according to the invention:

Carbon blacks: The carbon blacks may be produced by the lamp-black process, furnace-black process, gas-black process or thermal process and have BET surface areas of from 20 m²/g to 200 m²/g. The carbon blacks may optionally also contain heteroatoms, such as Si for example.

Amorphous silicas produced for example by precipitation from solutions of silicates or flame-hydrolysis of silicon halides with specific surface areas of from 5 to 1000 m²/g, preferably from 20 to 400 m²/g (BET surface area) and with primary particle sizes of from 10 to 400 nm. The silicas may optionally also be in the form of mixed oxides with other metal oxides, such as oxides of Al, Ga, B, Mg, Ca, Ba, Zn and titanium. The silicas may also have been doped with one or more of these metal ions.

Synthetic silicates, such as aluminium silicate, alkaline earth metal silicates such as magnesium silicate or calcium silicate, having BET surface areas of 20 to 400 $m^2/g$ and primary particle diameters of 10 to 400 nm.

Synthetic or natural aluminium oxides and synthetic or natural aluminium hydroxides.

Natural silicates, such as kaolin and other naturally occurring silicas.

Natural fibres, especially cellulose, micro- and/or nanocellulose and products made therefrom.

Glass fibres and glass-fibre products (mats, strands) or glass microbeads.

It is possible with preference to use amorphous silicas prepared by precipitation from solutions of silicates, with BET surface areas of 20 to 400 $m^2/g$, more preferably 100 $m^2/g$ to 250 $m^2/g$, in amounts of 5 to 150 parts by weight, based in each case on 100 parts of rubber.

The fillers mentioned may be used alone or in a mixture.

The rubber mixture may comprise 5 to 150 parts by weight of precipitated silica according to the invention and 0.1 to 20 parts by weight, preferably 1 to 18 parts by weight, more preferably 5 to 15 parts by weight, of organosilane, where the parts by weight are based on 100 parts by weight of rubber.

The rubber mixture may additionally comprise silicone oil and/or alkylsilane.

The rubber mixture according to the invention may comprise other known rubber auxiliaries, for example crosslinking agents, vulcanization accelerators, reaction accelerators, reaction retarders, antioxidants, stabilizers including ageing stabilizers, processing aids, plasticizers, waxes or metal oxides, and also optionally activators such as triethanolamine, polyethylene glycol or hexanetriol.

The rubber auxiliaries may be used in customary amounts guided by factors including the end use. Customary amounts may, for example, be amounts of 0.1% to 50% by weight based on rubber.

Crosslinkers used may be sulfur or organic sulfur donors.

The rubber mixture according to the invention may comprise other vulcanization accelerators. Examples of suitable vulcanization accelerators that may be used include mercaptobenzothiazoles, sulfenamides, guanidines, dithiocarbamates, thioureas, thiocarbonates, and also zinc salts of these, for example zinc dibutyldithiocarbamate.

The rubber mixture according to the invention may additionally comprise
a thiuram sulfide accelerator and/or carbamate accelerator and/or the corresponding zinc salts,
a nitrogen-containing co-activator,
optionally other rubber auxiliaries and
optionally other accelerators.

The weight ratio of accelerator to nitrogen-containing co-activator may be equal to or greater than 1.

The rubber mixture according to the invention may comprise at least 0.25 part by weight, based on 100 parts by weight of rubber, of tetrabenzylthiuram disulfide or tetramethylthiuram disulfide, at least 0.25 part by weight, based on 100 parts by weight of rubber, of diphenylguanidine, and cyclohexyl- or dicyclohexylsulfenamide.

It is possible with preference to use sulfenamides together with guanidines and thiurams, more preferably cyclohexylsulfenamide or dicylohexylsulfenamide together with diphenylguanidine and tetrabenzylthiuram disulfide or tetramethylthiuram disulfide.

The vulcanization accelerators and sulfur may be used in amounts of 0.1 to 10 parts by weight, preferably 0.1 to 5.0 parts by weight, based on the rubber used. It is possible with particular preference to use sulfur and sulfenamides in amounts of 1.0 to 4.0 parts by weight, thiurams in amounts of 0.2 to 1.0 part by weight, and guanidines in amounts of 0.0 part by weight to 3.0 parts by weight.

The invention further provides a process for preparing the rubber mixture according to the invention, which is characterized in that the rubber or mixture of rubbers, the precipitated silica according to the invention and optionally further rubber auxiliaries are mixed in a mixing unit.

The blending of the rubbers with the filler and any rubber auxiliaries can be conducted in customary mixing units, such as rolls, internal mixers and mixing extruders. Rubber mixtures of this type can typically be produced in internal mixers, by first incorporating the rubbers, the filler, the precipitated silica according to the invention and the rubber auxiliaries by mixing at 100 to 170° C., in one or more sequential thermomechanical mixing stages. The sequence of addition and juncture of addition of the individual components may have a crucial effect on the resultant properties of the mixture. It is typically possible to admix the resultant rubber mixture with the crosslinking chemicals in an internal mixer or on a roll at 40° C. to 110° C. and to process the mixture to give what is known as the crude mixture for the subsequent steps of the process, for example shaping and vulcanization.

The rubber mixture according to the invention can be vulcanized at temperatures of 80° C. to 200° C., preferably 130° C. to 180° C., optionally at a pressure of 10 bar to 200 bar.

The rubber mixtures according to the invention can be used to produce shaped bodies by vulcanization.

The rubber mixture according to the invention can be used for production of moulded articles, for example for the production of tyres, especially tyre treads, in the tyre carcass or in the tyre sidewall, cable sheaths, hoses, drive belts, conveyor belts, roll coverings, footwear soles, gasket elements, for example gasket rings, and damping elements.

The precipitated silicas according to the invention have the advantage that the corresponding rubber mixtures have improved dispersion of the silica. Moreover, the rubber mixtures according to the invention have improved reinforcement and better tear propagation characteristics. Furthermore, the elevated dynamic stiffnesses achieved, determined at 60° C., should lead to higher driving stability, i.e. improved handling characteristics on dry roads.

Test Methods:

Determination of Alkali Number

The alkali number (AN) is understood to mean the consumption of hydrochloric acid in ml (for a sample volume of 50 ml, 50 ml of distilled water and using hydrochloric acid of concentration mol/l) in a direct potentiometric titration of alkaline solutions, or suspensions, up to a pH of 8.30. The free alkali content of the solution or suspension is ascertained thereby.

The pH instrument (from Knick, model: 766 pH meter Calimatic with temperature sensor) and the pH electrode (combination electrode from Schott; model: N7680) are calibrated at room temperature with the aid of two buffer solutions (pH=7.00 and pH=10.00). The combination electrode is immersed into the standard solution or suspension equilibrated to 40° C., consisting of 50.0 ml of precipitation suspension and 50.0 ml of deionized water. Subsequently, hydrochloric acid solution of concentration 0.5 mol/l is added dropwise until a constant pH of 8.30 is established. Because equilibrium is established only slowly between the silica and the free alkali content, a wait time of 15 min is needed before the acid consumption can finally be read off. Given the molar amounts and concentrations chosen, hydrochloric acid consumption read off in ml corresponds directly to the alkali number, which is reported dimensionlessly.

pH—pH (Warm) of Silicas in Accordance with DIN EN ISO 787-9.

pH measurements during the production of the silica are effected on "warm" silica=measurement at 60° C.

The procedure is in accordance with DIN EN ISO 787-9 with the specifications described below:

A 5% (m/m) aqueous suspension of the sample to be analysed is prepared. For this purpose, demineralized (DM) water is used.

Before the measurement of pH, the sample suspension is agitated on an agitator for at least 5 minutes.

The pH is measured on a previously calibrated pH meter from Metrohm, model 780 with pH electrode 6.0228.000 (from Metrohm).

CTAB Surface Area—Determination in Accordance with ISO 5794-1 G

The method is based on the adsorption of buffered CTAB (N-cetyl-N,N,N-trimethylammonium bromide) in aqueous solution on the "outer" surface of silicas, which is also referred to as "rubber-active surface". Unadsorbed CTAB is back-titrated by means of NDSS (dioctylsodium sulfosuccinate solution). The endpoint of the titration is at the maximum rise in opacity of the solution.

The procedure is in accordance with ISO 5794-1 G, with specifications, additions and departures as described below:

In the course of sample preparation, specimens of silicas and silicates in the form of coarse particles are preferably ultrafinely ground by means of a suitable mill or crushed with a mortar and pestle and sieved through a 90 μm sieve, not crushed with a mortar and pestle and fractionated by means of a 150 μm sieve as described in the standard.

The suspensions composed of test specimen and CTAB solution having an expected CTAB surface area of less than 200 m²/g are stirred for 10 minutes. The suspensions composed of test specimen and CTAB solution having an expected CTAB surface area of not less than 200 m²/g are stirred for 35 minutes, as described in the standard.

After the adsorption, the silica is filtered through a 0.2 μm polyamide filter.

The filtrate is titrated using a Metrohm titroprocessor with an autosampler and Tirando 809. The phototrode used is the Spectrosense 523 nm from Metrohm.

BET Surface Area (N₂, Multipoint)—Determination in Accordance with DIN ISO 9277

The method serves to determine the specific $N_2$ surface area of silica by the BET method in accordance with DIN ISO 9277. In this method, the measurement is determined by low-temperature adsorption of nitrogen at defined partial pressures. The analysis is conducted as a multipoint determination and shows virtually linear behaviour in the partial pressure range (p/po) of 0.05-0.20 in the case of determination of 5 measurement points in total.

The procedure is in accordance with DIN ISO 9277 with the specifications described below:

Pelletized samples, before being weighed out, are cautiously crushed with a spatula and then degassed under reduced pressure using the MICROMERITICS VacPrep™ 061 evacuated degassing thermostat at (160+/−2)° C. for 60 minutes.

For determination of the BET surface area, the following 5 relative pressure points (p/po) are recorded during the adsorption phase: 0.0500; 0.0875; 0.1250; 0.1625 and 0.2000.

For the measurements, the TriStar 3000 series (3000/3020/3030) from MICROMERITICS with a static volumetric test method and a Dewar vessel is used.

Ro-Tap >300 μm; Ro-Tap <75 μm—Sieve Analysis in Accordance with ISO 5794-1 Annex F Sieve analysis is effected with a rotary sieving machine (Tyler Ro-Tap RX-29 analytical sieving machine with timer switch). The method is conducted in accordance with ISO 5794-1 Annex F. For the sieve analysis, the test sieves with various mesh sizes are stacked one on top of another (analytical sieve with metal sieve mesh, ISO 3310-1, nominal mesh size 75 μm, sieve diameter 200 mm, analytical sieve with metal sieve mesh, ISO 3310-1, nominal mesh size 150 μm, sieve diameter 200 mm, analytical sieve with metal sieve mesh, ISO 3310-1, nominal mesh size 300 μm, sieve diameter 200 mm). The sieving tower is inserted into the analytical sieving machine in the sequence specified. The sieve residues are determined in the following manner: The sample is gently homogenized prior to the determination. 100 g is weighed accurately to 0.01 g into a beaker on a precision balance, and the sample is transferred quantitatively onto the uppermost sieve (300 μm). The Ro-Tap sieving is effected for 5 min with the tapper. After sieving has ended, the sieving tower is removed and the fractions on the sieve pan and on the 75 μm, 150 μm and 300 μm sieves are weighed.

Calculation of Sieve Residues $$\text{Ro-Tap}<75 \text{ } \mu m \text{ in } \% = AS \cdot 100\% / E$$

and also $$\text{Ro-Tap}>300 \text{ } \mu m \text{ in } \% = A300 \cdot 100\% / E$$

and $$\text{Ro-Tap}>150 \text{ } \mu m \text{ in } \% = A150 \cdot 100\% / E$$

where
A300=residue on the 300 μm sieve in g
AS=residue in the sieve pan in g
E=starting weight in g pH—Determination on Silicas in Accordance with DIN EN ISO 787-9

The procedure is in accordance with DIN EN ISO 787-9 with the specifications described below:

Pelletized sample material is pulverized by mortar and pestle before being weighed out.

A 5% (m/m) aqueous suspension of the sample to be analysed is prepared. For this purpose, demineralized (DM) water is used.

Before the measurement of pH, the sample suspension is agitated on an agitator for at least 5 minutes.

The pH is measured at 23° C.+/−2° C. on a previously calibrated pH meter from Metrohm, model 780 with pH electrode 6.0228.000 (from Metrohm).

Drying Loss—Determination in Accordance with DIN EN ISO 787-2

The weight loss of a sample heated at 105° C. in a drying cabinet for 2 h is determined.

The procedure is in accordance with DIN EN ISO 787-2 with the specifications described below:

The weighing bottle (with flanged lid; diameter about 80 mm, height about 30 mm) is heated at 105° C. with the lid off for about 1 h. After cooling in a desiccator, the lid is inserted. The weight is determined accurately to 0.01 g on a precision balance. 5 g to 10 g of the sample (weight depending on the bulk density) is weighed out accurately and spread out on the base of the weighing bottle in a uniform layer. The weighing bottle is cautiously opened and heated at $(105\pm2)°$ C. in a drying cabinet for 2 h (lid is heated as well, but the weighing bottle is not yet closed therewith).

Thereafter, the weighing bottle is cautiously closed with the lid and left to cool in a desiccator and reweighed accurately to 0.01 g.

Calculation $$\text{Volatiles/\%} = \frac{(E - A) \cdot 100\%}{E}$$

$E$ = starting weight in g $A$ = final weight in g

Sears Number$_{original}$ (SN)—Determination on Hydrophilic Silicas

By titration of silica with standard 0.1 mol/1 potassium hydroxide solution in the range from pH 4 to pH 9, it is possible to determine the Sears number$_{original}$ as a measure of the number of free silanol groups.

The method of determination is based on the following chemical reactions, where SiOH is supposed to represent a silanol group of the silica:

$$\equiv\text{SiOH} + \text{NaCl} \rightleftharpoons \equiv\text{SiONa} + \text{HCl}$$

$$\text{HCl} + \text{KOH} \rightleftharpoons \text{KCl} + \text{H}_2\text{O}.$$

Procedure:

About 10.0 g of a pulverulent, spherical or granular silica is uniformly comminuted with a Fritsch mill (Pulverisette 14 with 80 μm screen) at 10 000 rpm for 60 seconds. About 1.50 g of the silica thus treated is weighed accurately to 0.1 mg into a 250 ml beaker and admixed with 150 ml of NaCl solution (β (NaCl)=200 g/l, adjusted to pH 3 with hydrochloric acid c(HCl)=1 mol/l). After complete wetting of the sample, the suspension is dispersed by means of an Ultra Turrax PT1300D (from Polytron) at a speed of 20 000 rpm for 30 seconds.

Before the titrations, the pH meter (LL Unitrode pH electrode from Metrohm, model: PT1000) is calibrated at room temperature using buffer solutions (pH 4.00, pH 7.00 and pH 9.00). The pH meter is first used to measure the starting pH of the suspension, then, according to the result, the pH is adjusted to 4.00 with potassium hydroxide solution (0.1 mol/l) or hydrochloric acid solution (0.1 mol/l). Subsequently, 0.1 mol/l standard KOH solution is used to conduct the titration up to pH 9.00. The consumption of KOH solution in ml from pH 4.00 to pH 9.00 corresponds to $V_{pH4-9}$. In the same way, a blank titration (without addition of silica) is conducted. The blank value of the solution describes the volume of potassium hydroxide solution $V_{BL}$ which is required to titrate the NaCl solution without silica from pH 4 to pH 9.

The Sears number$_{original}$ based on the original substance with the unit ml/(1.5 g) is calculated from:

$$\text{Sears number}_{original} = (V_{pH4-9} - V_{BL}) * T * (1.5\text{ g})/E$$

With T=titre of the standard KOH solution used

E=initial mass of the sample, in g

Silanol Group Density (SD)—Calculation Via the AN, Based on CTAB Surface Area

The AN gives the consumption of 0.1 n KOH in ml/(1.5 g):

$$AN \cdot \frac{ml\dfrac{0.1\text{ mmol}}{ml}}{1.5\text{ g}} = AN \cdot 0.1\frac{\text{mmol}}{1.5\text{ g}}$$

Applying the CTAB surface area and Avogadro's constant (NA) gives:

$$AN \cdot 0.1 \cdot \frac{\text{mmol}}{1.5\text{ g} \cdot CTAB}\frac{\text{g}}{\text{m}^2} N_A$$

This gives the silanol group density (SD) in OH/nm²:

$$SD = AN \cdot 0.1\frac{\text{mmol} \cdot \text{g}}{1.5\text{ g} \cdot CTAB \cdot \text{m}^2} \cdot N_A$$

$$SD = \frac{AN \cdot 40{,}1476057}{\text{nm}^2 \cdot CTAB}$$

where, in the formulae for SD, the AN and the CTAB surface area are used in dimensionless form since these are already taken into account in the calculation.

Ignition Residue—Determination in Accordance with ISO 3262-1 or ASTM D 6740

By igniting the precipitated silica at 1000° C. in an ignition furnace for 2 h, the total water content (physically and chemically bound) and hence the content of all volatile components (ignition loss) is determined, from which it is also possible to calculate the ignition residue.

Procedure:

About 500 mg in each case of silica is weighed out in two porcelain crucibles or melting crucibles with the aid of a spatula on an analytical balance having an accuracy of ±0.1 mg. Subsequently, the crucibles together with silica are subjected to ignition in an ignition furnace at $(1000\pm50)°$ C. for $(120\pm5)$ min.

After the ignition, the crucibles are placed into a desiccator with a suitable desiccant for cooling for about 1.5-2 h and reweighed with an analytical balance. The determination is performed in duplicate.

Evaluation: First of all, the ignition loss is calculated based on the dried matter:

$$IL[\%] = \frac{m_B \cdot \dfrac{100 - DL}{100} - m_A}{m_g \cdot \dfrac{100 - DL}{100}} \cdot 100$$

| | | |
|---|---|---|
| IL$_{(DM)}$: | Ignition loss based on the matter dried at 105° C. for 2 h in % | in % |
| m$_E$: | Mass of silica weighed out | in g |
| m$_A$: | Mass of silica after ignition | in g |
| DL: | Drying loss at 105° C. for 2 h | in % |

Ignition residue based on the original substance is calculated as follows:

$$IL(\text{orig.}) = IL_{(DM)} * (100 - DL)/100 \text{ and hence}$$

$$IR(\text{orig.}) = 100\% - DL - IL(\text{orig.})$$

For this purpose, drying loss is determined by the method of "Determination of drying loss in accordance with DIN EN ISO 787-2" (see above).

TAR—Pelletized Material Abrasion by Means of Friability Test

For abrasion by pelletized material friability test, the fine and coarse fractions of the silica are removed and the 3.15 mm-5.00 mm fraction is used. The pelletized material fraction is subjected to repeated mechanical stress in a rotating friability chamber (e.g. ERWEKA TAR 220 with friability drums on the left and right) for 30 minutes. Subsequently, the resultant fines fraction is removed by means of a 500 μm sieve. The difference in mass in % corresponds to the pelletized material abrasion.

The determination of the abrasion is conducted in duplicate.

A representative 50 g sample of the silica to be analysed is taken. Sieving-out of the 3.15 mm-5.00 mm grain fraction by cautious manual sieving (analytical sieves with metal sieve mesh, ISO 3310-1, sieve diameter 200 mm—nominal mesh size 500 μm, 3.15 mm and 5 mm, and sieve pan). This excludes fines and very coarse particles. (5.00±0.1) g of the 3.15 mm-5 mm fraction is weighed out accurately on an analytical or precision balance. If the amount sieved out should be insufficient, the measurement cannot be performed. A representative portion of the sample must be taken. The sample is introduced into the friability drum; this is mounted on the abrasion tester. The instrument is operated at 65 rpm for 30 minutes. Subsequently, the material is applied quantitatively to a 500 μm sieve, and the adhering fines fraction is removed by moderate agitation/movement. The pelletized material particles are then reweighed accurately to 0.01 g on the precision or analytical balance.

Evaluation $$\text{Abrasion (\%)} = \frac{(E - A) * 100\%}{E}$$

Abrasion: abrasion by pelletized material friability test in %

E: starting weight of the 3.15-5 mm fraction sieved out in g

A: residue after stress and removal of the fines in g

The measurement result is the average from two individual measurements and is reported in % with one post-decimal place.

DOA Absorption—Determination in Accordance with ISO 19246

For performance, 12.50±0.02 g of the sample is introduced into the kneader chamber of the Brabender Absorptometer E with extended functionality/evaluation unit. Then, with constant kneading, dioctyl adipate (e.g. Plastomoll® DOA) is metered in at a metering rate of 4 ml/min. The kneader speed is 125 rpm. The program uses the raw data curve to calculate a polynomial. The 70% value of maximum torque of this polynomial serves to ascertain the DOA absorption based on original material in ml/(100 g). The determination is effected in accordance with ISO 19246.

In the case of pelletized silica, the determination is effected using the 1.0-3.15 mm grain fraction that has to be produced beforehand by sieving with the appropriate sieves.

The following settings should be made in the measuring instrument software:

Test Condition

Metering rate (burette): 4.0 ml/min

Kneader speed: 125 min-1

Temperature: 23.0° C.

Evaluation

Torque threshold: 100 mNm

End: 60 s after attainment of the maximum torque

Torque limit: 10 000 mNm

Polynomial

Start: 50% of maximum torque

End: 20 s after attainment of the maximum

Using suitable reference materials of different DOA absorption, it is possible with the aid of the Brabender® software to conduct individual standardization of the analytical kneader. Based on the standardization function ascertained (linear equation $Y=a*x+b$), the DOA absorption (standardized) based on original substance in ml/(100 g), expressed as the 70% value of the torque maximum, is taken from the measurement report.

Electrical conductivity—determination in accordance with DIN EN ISO 787-14

The electrical conductivity of silicas is determined in accordance with DIN EN ISO 787-14. Compared to the provisions of this standard, the following changes were made in the procedure:

A 4% aqueous suspension is prepared (4.00 g of silica per 100 ml of deionized water) and analysed.

The measurement is made directly on the suspension, not the filtrate.

The measurement is effected at 20.0° C.±0.5° C., and the conductivity is reported for the reference temperature of 20° C.

Determination of Pore Radii and Pore Volumes Based on Hg Intrusion in Accordance with DIN 66133

In a pressure range from 0.003 to 420 MPa, the pore radii, the corresponding pore volume and the pore distribution of silica samples are ascertained. The determination is effected with the Micromeritics AutoPore IV 9520 in accordance with DIN 66133.

The sample is dried in a drying cabinet at 105±2° C. for 2 h.

For the measurement, the sample prepared is weighed out into the Micromeritics model 16 penetrometer. About 330 mg is weighed out accurately to 0.001 g. Subsequently, the penetrometer is evacuated gradually to 50 μm Hg in the low-pressure port of the measuring instrument and left at that pressure for 5 min. Subsequently, the penetrometer is filled with mercury first in the low-pressure port and then in the high-pressure port up to a pressure of 420 MPa, and the measurement curve (pressure/volume curve) is recorded. The Autopore instrument is operated in accordance with the operating instructions from Micromeritics and is software-controlled. Each measurement is corrected by a blank measurement of the penetrometer. The overall measurement range is 0.003-420 MPa.

The measurement results are calculated from the measurement curve as follows:

PORE maximum:

Hg, −dV/d log D; contact angle 140°, surface tension 480 mN/m in nm

PV:

Hg, 0.0042-414 MPa; contact angle 140°, surface tension 480 mN/m in ml/g

V (d5–d50)/V (d5–d100):

Is determined according to WO2008077948 from the Hg porosimetry.

Bulk Density—Determination in Accordance with ASTM D 1513

A 1000 ml measuring cylinder (with 20 ml gradation) with a powder funnel on top (funnel capacity at least 1 l) is tared on a precision balance (accuracy 0.1 g). The sample to be analysed is mixed well by cautiously rotating the sample vessel. In the case of pelletized materials, it should be particularly ensured that no additional fines are generated. After the mixing, a scoop is used to transfer between 500 ml and 700 ml of silica cautiously into a 1 l beaker (with rough division). The silica sample is poured all together through the funnel into the measuring cylinder. After settling (without mechanical densification), the bulk material volume is read off accurately to 5 ml. It should be ensured here that the fill volume is between 500 ml and 700 ml. At the same time, for calculation of the bulk density, the weight of the sample is ascertained accurately to ±0.1 g.

Calculation of Bulk Density:

$$D = \frac{1000 \cdot m}{V}$$

In this formula:

bulk density in g/l

V volume of the sample after agitation in ml m mass of the sample in g

The determination is performed in duplicate. If the two results differ from one another by more than 3%, a third value is used to form the average. The result is reported without post-decimal places.

EXAMPLES

Example 1

A reactor with a propeller stirrer system is initially charged with 1140 l of water and 150 kg of waterglass, and heated up to 88.8° C. Within 100 minutes, 727.9 kg of waterglass (density 1.345 kg/l, 27% $SiO_2$, 8% $Na_2O$) and 77.6 kg of sulfuric acid (density 1.84 kg/l, 96% $H_2SO_4$) are added simultaneously, such that the AN in the reaction mixture is 24-27.

Subsequently, sulfuric acid (density 1.84 kg/l, 96% $H_2SO_4$) is added, such that the pH in the reaction mixture is 8.6 (measured at 60° C.).

The temperature in the precipitation vessel is increased to 94° C. within 5 minutes, and the suspension is subjected to ageing while stirring at 94° C. for 55 minutes.

Thereafter, further sulfuric acid (density 1.84 kg/l, 96% $H_2SO_4$) is fed in at a metering rate of kg/min until a pH of 7 (measured at 60° C.) has been attained. Then further sulfuric acid is added at a metering rate of 0.35 kg/min to a pH of 4.0 (measured at 60° C.).

The resulting suspension is filtered and washed with water as usual and subjected to spin-flash drying. The powder thus obtained is pelletized, i.e. compacted in a roll compactor and then crushed by means of a crusher.

Example 2

A reactor with a propeller stirrer system is initially charged with 1164 l of water and 150 kg of waterglass (AN 25-26), and heated up to 89.0° C. The following are added simultaneously within 100 minutes: waterglass at an average metering rate of 7.3 kg/min (density 1.345 kg/l, 27% $SiO_2$, 8% $Na_2O$) and sulfuric acid (density 1.84 kg/l, 96% $H_2SO_4$) at an average metering rate of 0.82 kg/min.

Subsequently, further sulfuric acid (density 1.84 kg/l, 96% $H_2SO_4$) is added, such that the pH in the reaction medium is 8.5 (measured at 60° C.).

The temperature in the precipitation vessel is increased to 94° C. within 5 minutes, and the suspension is subjected to ageing while stirring at 94° C. for 55 minutes.

Thereafter, further sulfuric acid (density 1.84 kg/l, 96% $H_2SO_4$) is added at a metering rate of 0.70 kg/min, at first down to a pH of 7 (measured at 60° C.), and then acidification is continued at a metering rate of 0.35 kg/min down to a pH of 4.0 (measured at 60° C.).

The resulting suspension is filtered and washed with water as usual and subjected to spin-flash drying. The powder thus obtained is pelletized, i.e. compacted in a roll compactor and then crushed by means of a crusher.

The silicas have the analytical parameters reported in Table 1.

TABLE 1

| Parameter | Unit | Reference silica I | Inventive silica I Example 1 | Inventive silica II Example 2 |
|---|---|---|---|---|
| BET surface area ($N_2$, multipoint) | $m^2/g$ | 74 | 77 | 90 |
| CTAB surface area | $m^2/g$ | 80 | 82 | 90 |
| DOA absorption | ml/(100 g) | 123 | 148 | 169 |
| Ro-Tap > 300 μm | % | 84.5 | 94.3 | 94.9 |
| Ro-Tap < 75 μm | % | 3.5 | 1.3 | 1.5 |
| Sears number$_{original}$ | ml/(1.5 g) | 10.6 | 11.7 | 12.4 |
| Silanol group density | $OH/nm^2$ | 5.3 | 5.7 | 5.5 |
| Drying loss | % | 6.1 | 5.7 | 5.4 |
| pH | | 7.7 | 6.5 | 7.1 |
| Electrical conductivity | μS/cm | 806 | 1180 | 176 |
| Ignition residue | % | 4.1 | 4.4 | 4.1 |
| Bulk density | g/l | 347 | 314 | 298 |
| TAR | % | not measurable | 22.4 | 21.0 |
| V(d5-d50)/ (d5-d100) | | 0.65 | 0.64 | 0.64 |
| PV | ml/g | 1.27 | 1.42 | 1.54 |
| Pore maximum | nm | 61 | 61 | 57 |

Reference silica 1 is ZEOSIL® 1085 GR from Solvay S. A.

Example 3

Examination of Rubber Characteristics

The formulation (green tyre compound) used for the rubber mixtures is specified in Table 2 below. In this table, the unit phr means parts by weight based on 100 parts of the crude rubber employed.

TABLE 2

| | | | Formulation of the green tyre mixture | | |
|---|---|---|---|---|---|
| Name | Con-stituent | Production/ supplier | Rubber mixture 1 (compar-ative) with reference silica I | Inventive rubber mixture 2 with inventive silica I | Inventive rubber mixture 3 with inventive silica II |
| Stage 1 | | | phr | phr | phr |
| Buna VSL 4526-2 | S-SBR; see note [1] | ARLANXEO Deutschland GmbH | 96.25 | 96.25 | 96.25 |
| Buna CB 24 | Nd-BR; see note [2] | ARLANXEO Deutschland GmbH | 30.00 | 30.00 | 30.00 |
| Reference silica I | | Solvay S.A. | 90.00 | | |
| Inventive silica I | | Evonik Resource Efficiency GmbH | | 90.00 | |
| Inventive silica II | | Evonik Resource Efficiency GmbH | | | 90.00 |
| Si 266 | Bifunc-tional silane | Evonik Resource Efficiency GmbH | 5.80 | 5.80 | 5.80 |
| N330 | Industrial carbon black | Orion Engineered Carbons GmbH | 5.00 | 5.00 | 5.00 |
| ZnO RS RAL 844 C | ZnO | Carl Arnsperger Chemikalien GmbH & Co. | 2.00 | 2.00 | 2.00 |
| Edenor ST1 GS | Stearic acid | Caldic Deutschland GmbH | 2.00 | 2.00 | 2.00 |
| Vivatec 500 | TDAE | H&R GmbH Co. KGaA | 8.75 | 8.75 | 8.75 |
| Vulkanox HS/LG | TMQ | LANXESS Deutschland GmbH | 1.50 | 1.50 | 1.50 |
| Vulkanox 4020/LG | 6PPD | LANXESS Deutschland GmbH | 2.00 | 2.00 | 2.00 |
| Protektor G 3108 | Wax | Paramelt B.V., the Netherlands | 2.00 | 2.00 | 2.00 |
| Stage 2 Stage 1 batch | | | | | |
| Rhenogran DPG-80 | DPG 80% | Rhein Chemie additives GmbH | 2.50 | 2.50 | 2.50 |
| Stage 3 Stage 2 batch | | | | | |
| Richon TBZTD-OP | TBzTD | WEBER & SCHAER GmbH & Co. KG (produced by Dalian Richon) | 0.20 | 0.20 | 0.20 |
| Vulkacit CZ/EG-C | CBS | LANXESS Deutschland GmbH | 1.60 | 1.60 | 1.60 |

TABLE 2-continued

| | | | Formulation of the green tyre mixture | | |
|---|---|---|---|---|---|
| Name | Con-stituent | Production/ supplier | Rubber mixture 1 (compar-ative) with reference silica I | Inventive rubber mixture 2 with inventive silica I | Inventive rubber mixture 3 with inventive silica II |
| Sulfur | Ground sulfur | HENSELER GmbH | 2.00 | 2.00 | 2.00 |

[1] Buna ® VSL 4526-2 HM is a solution styrene-butadiene rubber extended with 37.5 phr TDAE oil;
Mooney (1 + 4 @ 100° C.): 62 ME;
vinyl: 44.5%;
styrene: 26%

The rubber mixture is produced in three stages in an internal mixer in accordance with the tabular listing below (Table 3):

TABLE 3

| | Method for mixture production |
|---|---|
| Mixer | HF MIXING GROUP (Harburg-Freudenberger Maschinenbau GmbH) |
| Stage 1 | GK 1.5 N, fill level 0.73; 70 rpm; chamber temperature: 70° C.; friction 1:1.11 |
| min:sec Mixing time | Target batch temperature: 145° C.-155° C. |
| 00:00-00:15 | At 00:00: Add polymers; Vulkanox HS; Vulkanox 4020; close plunger and mix for 15 s |
| 00:15-01:15 | At 00:15: Add 45 phr of silica, Si 266; close plunger and mix for 60 s |
| 01:15 | Move plunger halfway up, for ventilation and cleaning of the plunger |
| 01:15-02:15 | Open oil bag (LD-PE plastic bag 150 × 200 mm, IGEFA Handelsgesellschaft) before commencement of the mixing stage and put the carbon black into the bag; at 01:15: a) add prepared bag b) 1/2 silica c) Protektor G 3108 d) close plunger and mix for 60 s |
| 02:15-03:45 | At 02:15: Add ZnO and stearic acid; close plunger and mix for 90 s; maintain the target batch temperature by varying the speed at 150° C. +/− 5° C. |
| 03:45 | Discharge mixture and check the batch by weighing Apply the discharged batch to a laboratory roll heated to 60° C. and form a sheet thereon within 45 s at a roll nip of 4 mm and suitable rotation speeds. In so doing, do not cut into, turn over or fold over the sheet. Thereafter, take the sheet off the roll and take a sample if necessary, and cut to the weight for the second mixing stage. The intermediate storage of the sheet for the second mixing stage is 24 +/− 3 h at 23 +/− 3° C. The wait time between mixing stages 1 & 2 should be understood such that all mixtures belonging to a mixing series, after commencement of the mixing of the first compound in the series, are mixed further in direct succession without further interruptions. |
| Stage 2 | GK 1.5 N, fill level 0.70; 75 rpm; chamber temperature: 75° C.; friction 1:1.11 |
| min:sec Mixing time | Target batch temperature: 145° C.-155° C. |
| 00:00-01:00 | At 00:00: Add the stage 1 batch; close plunger and mix for 60 s |
| 01:00-03:00 | At 01:00: Add Rhenogran DPG-80; close plunger and mix for 120 s; maintain the target batch temperature by varying the speed at 150° C. +/− 5° C. |
| 03:00 | Discharge mixture and check the batch by weighing Apply the discharged batch to a laboratory roll heated to 60° C. and form a sheet thereon within 45 s at a roll nip of 4 mm and suitable rotation speeds. In so doing, do not cut into, turn over or fold over the sheet. Thereafter, take the sheet off the roll and take a sample if necessary, and cut to the weight for the third mixing stage. The intermediate storage of the sheet for the third mixing stage is 4 h up to |

TABLE 3-continued

Method for mixture production

| | |
|---|---|
| | 24 h at 23 +/− 3° C. The wait time between mixing stages 2 & 3 should be understood such that all mixtures belonging to a mixing series, after commencement of the mixing of the first compound in the series, are mixed further in direct succession without further interruptions. |
| Stage 3 min:sec Mixing time | GK 1.5 N, fill level 0.68; 50 rpm; chamber temperature: 50° C.; friction 1:1.11 Batch temperature: 90° C.-110° C. |
| 00:00-02:00 | At 00:00: Add the stage 2 batch and TBzTD, CBS, sulfur; close plunger and mix for 120 s |
| 02:00 | Discharge mixture and check the batch by weighing Apply the discharged batch to a laboratory roll heated to 60° C. and form a sheet within 20 s at a roll nip of 4 mm and suitable rotation speeds. Cut into the sheet three times from the right and turn over each time, cut in three times from the left and turn over each time, and fold over tightly three times. For sampling thereafter, discharge the sheet in the appropriate thickness necessary, take sample, fold together again and put back onto the rotating roll until all the necessary samples have been taken. |

The general method for producing rubber mixtures and vulcanizates thereof is described in the following book: "Rubber Technology Handbook", W. Hofmann, Hanser Verlag 1994.

The vulcanization time for each of the test specimens at 165° C. is 15 min. Rubber testing is effected in accordance with the test methods specified in Table 4.

TABLE 4

Procedures for performance of physical tests

| Test/method | Raw mixture Vulcanizate | Physical parameter | Unit | Test conditions | Standard |
|---|---|---|---|---|---|
| MDR; 165° C.; 0.5°: Delta torque | R | Delta torque MDR | dNm | Test at 165° C.; 0.5° | DIN 53529/3, ISO 6502 |
| Tensile test: | V | Ultimate tensile strength | MPa | Test at 23° C.; standard ring R1; takeoff speed 500 mm/min | DIN 53504, ISO 37 |
| Tensile test: Tensile strength 200% modulus | V | Stress value at 200% elongation | MPa | Test at 23° C.; standard ring R1; takeoff speed 500 mm/min | DIN 53504, ISO 37 |
| Tensile test: 200%/50% modulus | V | Stress value at 200% elongation divided by the stress value at 50% elongation, corresponds to the reinforcement ratio | — | Test at 23° C.; standard ring R1; takeoff speed 500 mm/min | DIN 53504, ISO 37 |
| Tensile test: Elongation at break | V | Elongation at break | % | Test at 23° C.; standard | DIN 53504, ISO 37 |

TABLE 4-continued

Procedures for performance of physical tests

| Test/method | Raw mixture Vulcanizate | Physical parameter | Unit | Test conditions | Standard |
|---|---|---|---|---|---|
| | | | | ring R1; takeoff speed 500 mm/min | |
| DIN abrasion | V | DIN abrasion: Loss of volume | mm³ | 10 N | DIN ISO 4649, ISO 2781, Method A |
| Tear resistance DIE C; 23° C. | V | Tear resistance DIE C; 23° C. | N/mm | Test at 23° C.; standard test specimen; takeoff speed 500 mm/min | DIN 53515 test specimen without incision |
| Tear resistance GRAVES; 23° C. | V | Tear resistance | N/mm | Test at 23° C.; standard test specimen; takeoff speed 500 mm/min | DIN 53515 |
| Tear resistance GRAVES; 60° C. | V | Tear resistance | N/mm | Test at 60° C.; standard test specimen; takeoff speed 500 mm/min | DIN 53515 |
| Ball rebound; 23° C. | V | Resilience/% | % | Fall height 500 mm, steel ball with d = 19 mm, 28 g | ASTM D 2632 |
| RPA strain sweep; 60° C.: G* | V | Complex shear modulus G* | MPa | RPA: 2nd strain sweep on the vulcanizate 1.6 Hz; 60° C.; 0.28%-42% test at 60° C., 1.6 Hz, 0.28%-42.0% "Operators Manual RPA 2000" from Alpha Technologies, February 1997 | ASTM D 6601-02 |
| ZWICK force controlled; 60° C.: E* | V | Complex modulus E* | | 16 Hz, initial force 50 N and amplitude force 25 N, heat treatment time 5 min, parameters recorded after 30 s testing time | DIN 53513, ISO 4664-1 |
| ZWICK force | V | Loss factor tan δ | — | 16 Hz, initial | DIN 53513, ISO 4664-1 |

19

TABLE 4-continued

| | Procedures for performance of physical tests | | | | |
|---|---|---|---|---|---|
| Test/ method | Raw mixture Vul- canizate | Physical parameter | Unit | Test conditions | Standard |
| controlled; 0° C.: tan δ | | | | force 50 N and amplitude force 25 N, heat treatment time 5 min, parameters recorded after 30 s testing time | |
| Dispersion: DisperTester 3000 plus (100×) | V | Rating on the basis of undispersed particles | % | Works settings; rating-the higher the value, the better the dispersion | ISO 11345 : 2006; ASTM D 7723 |
| Dispersion: TOPO- Peak area | V | Roughness on account of undispersed particles | % | Roughness on account of un-dispersed particles => the lower the value, the better the dispersion | In accordance with ASTM D 2663; described in DE 199 17 975 C 2 Determination by means of a topographic method, described in: "Entwicklung eines Verfahrens zur Charakterisierung der Füllstoff-dispersion in Gummimischungen mittels einer Oberflächen-topographie [Development of a surface-topography method for characterizing filler dispersion in vulcanized rubber mixtures]" A. Wehmeier; Degree thesis 1998 at the Münster University of Applied Sciences, Steinfurt site, in the Chemical Engineering Department |

20

TABLE 4-continued

| | Procedures for performance of physical tests | | | | |
|---|---|---|---|---|---|
| Test/ method | Raw mixture Vul- canizate | Physical parameter | Unit | Test conditions | Standard |
| | | | | | and "Filler dispersion Analysis by Topography Measurements" Degussa AG, Applied Technology Advanced Fillers, Technical Report TR 820. |
| Dispersion: TOPO- Considered sum of peaks | V | Number of defects on account of undispersed particles | — | Number of defects resulting from inadequate dispersion => the lower the value, the better the dispersion | In accordance with ASTM D 2663; described in DE 199 17 975 C 2 Determination by means of a topographic method, described in: "Entwicklung eines Verfahrens zur Charakterisierung der Füllstoff-dispersion in Gummimischungen mittels einer Oberflächen-topographie" A. Wehmeier; Degree thesis 1998 at the Münster University of Applied Sciences, Steinfurt site, in the Chemical Engineering Department and "Filler dispersion Analysis by Topography Measurements" Degussa AG, Applied Technology Advanced Fillers, Technical Report TR 820. |

TABLE 5

| Performance data of the examples | | Rubber mixture 1 (comparative) | Inventive rubber mixture 2 | Inventive rubber mixture 3 |
|---|---|---|---|---|
| MDR: 165° C.; 0.5° Delta torque MDR | dNm | 12.7 | 15.0 | 14.3 |
| Tensile strength (4 rings R1 @ 23° C.) | MPa | 9.5 | 10.7 | 10.8 |
| 200% modulus | MPa | 5.7 | 6.8 | 6.5 |
| 200%/50% modulus | — | 6.6 | 6.8 | 6.7 |
| Elongation at break | % | 300 | 300 | 310 |
| DIN abrasion | mm³ | 94 | 80 | 87 |
| Tear resistance DIE C, 23° C. | N/mm | 35 | 38 | 36 |
| Tear resistance GRAVES, 23° C. | N/mm | 13 | 21 | 16 |
| Tear resistance GRAVES, 60° C. | N/mm | 22 | 34 | 27 |
| Ball rebound, 23° C. | % | 45 | 41 | 43 |
| E*; 60° C. | MPa | 5.4 | 6.4 | 16.0 |
| tan δ, 0° C. Zwick | — | 0.393 | 0.432 | 0.422 |
| RPA: 2nd strain sweep vulcanizate 1.6 Hz, 60° C., 0.28%-42% Modulus | MPa | 1.6 | 2.2 | 1.9 |
| Dispersion: DisperTester 3000 plus (100×) | % | 87.6 | 94.4 | 91.3 |
| Dispersion: Peak area (Topo) | % | 19.2 | 1.7 | 7.7 |
| Considered sum of peaks | — | 334 | 32 | 140 |

The rubber data of the rubber mixtures according to the invention that are shown in Table 5 show the superior dispersion/dispersibility of the silicas according to the invention compared to the prior art, rubber mixture 1 (comparative). Inventive rubber mixtures 2 and 3, in the case of direct measurement of the defects in sections through the vulcanizates, clearly have a lower level of undispersed silica by means of tactile topography measurement, and visually by means of the dispersion tester. Combined with this, there is also a distinct improvement in all measurements of relevance in respect of reinforcement: In the tensile test, there was a clear improvement in stress values with the same elongation at break. This is also in accordance with the improved tear results Die C and Graves under various measurement conditions. There is also an improvement in DIN abrasion for the rubber mixtures according to the invention compared to the reference mixture. These advantages indicate that a tyre having a tyre tread including and reinforced by the silicas according to the invention will have a distinct improvement in wear characteristics. The indicators of ball rebound, 23° C., and tan δ at 0° C. additionally also show clearly improved values for the wet skid characteristics of such treads. High stiffness at high temperatures (E*, 60° C. and modulus (max) in RPA) under these measurement conditions additionally also shows improved handling characteristics on dry roads compared to the prior art.

All in all, these rubber mixtures and the silicas according to the invention are thus very particularly capable of optimizing and improving the overall performance of winter tyres, for example, or the even more specialized Nordic winter tyres, to a very high degree.

The invention claimed is:

1. Precipitated silicas, having:
   a N-cetyl-N,N,N-trimethylammonium bromide (CTAB) surface area ≤115 m²/g,
   a dioctyl adipate (DOA) absorption ≥130 ml/(100 g),
   a RoTap for >300 μm of ≥86%,
   a silanol group density ≥5.4 OH/nm², and
   a pore volume distribution of V (d5–d50)/V (d5–d100) <0.66.

2. The precipitated silicas according to claim 1, having a CTAB surface area ≤90 m²/g.

3. The precipitated silicas according to claim 1, having a PV value at 0.0042 MPa-414 MPa, and 140°, in the range of 1.00-3.00 ml/g.

4. The precipitated silicas according to claim 1, having a bulk density of at least 180 g/l.

5. The precipitated silicas according to claim 1, having a grain length ≥1 mm.

6. A method of producing the precipitated silicas according to claim 1, comprising:
   a) forming an aqueous solution of an organic and/or inorganic salt and/or an alkali metal or alkaline earth metal silicate and/or an organic and/or inorganic base with a pH ≥9;
   b) adding a waterglass and an acidifying agent simultaneously into the aqueous solution while stirring at 80-98° C. for 60-120 minutes;
   c) adding acid only in a smaller amount than in b) in order to attain a mixture with a pH (measured at 60° C.) of 9.0-10.0;
   d) stirring the mixture at a temperature >85° C. for 45 min to 200 min, without adding further reactants;
   e) adding sulfuric acid for acidification to a pH of about 3.5-4.5 € when measured at 60° C.) to obtain a mixture of precipitated silica;
   f) filtering the precipitated silica from the mixture,
   g) washing the filtered precipitated silica;
   h) drying the washed precipitated silica to a drying loss of <8%, and
   i) forming a pellet of the dried precipitated silica.

7. A rubber mixture comprising:
   (A) a rubber or a mixture of rubbers; and
   (B) at least one precipitated silica according to claim 1.

8. A method of producing the rubber mixture according to claim 7, comprising:
   mixing the rubber or the mixture of rubbers, the at least one precipitated silica, and optionally further rubber auxiliaries in a mixing unit.

9. A material comprising the rubber mixture of claim 7, wherein the material is selected from the group consisting of tires, cable sheaths, hoses, drive belts, conveyor belts, roll coverings, footwear soles, gasket elements and damping elements.

* * * * *